April 17, 1934.　　W. D. FOSTER ET AL　　1,954,808
FILM HANDLING APPARATUS
Original Filed May 31, 1930　2 Sheets-Sheet 1

INVENTOR.
W. D. FOSTER.
F. D. SWEET.
BY Waldo G. Morse
ATTORNEYS.

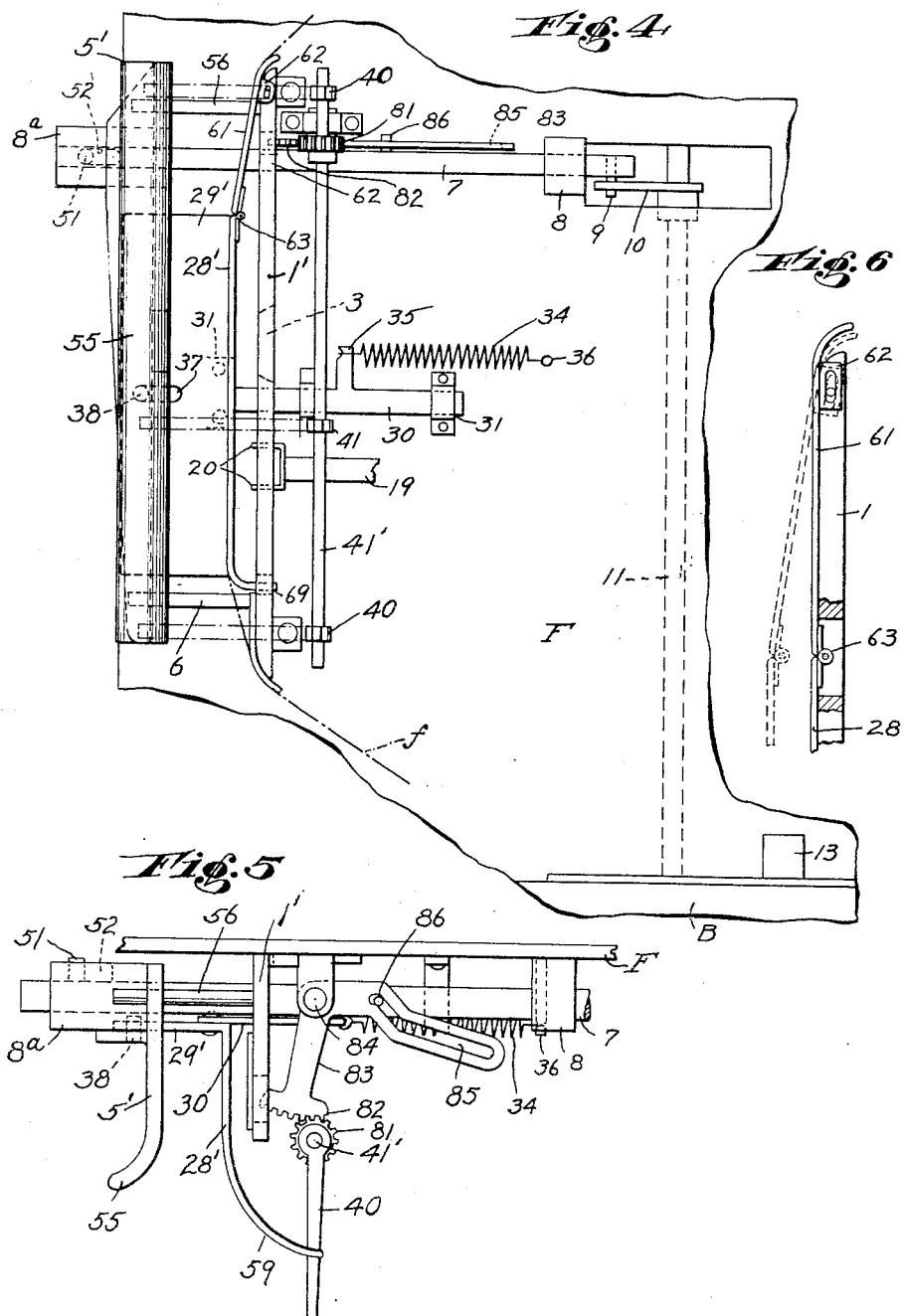

Patented Apr. 17, 1934

1,954,808

UNITED STATES PATENT OFFICE 1,954,808

FILM HANDLING APPARATUS

Warren Dunham Foster, Washington Township, Bergen County, N. J., and Frederick Davenport Sweet, New York, N. Y., assignors, by direct and mesne assignments, to Kinatome Patents Corporation, New York, N. Y., a corporation of New York Application May 31, 1930, Serial No. 458,536
Renewed June 14, 1933

17 Claims. (Cl. 88—17)

The present invention relates broadly to any art in which a film or other material of similar characteristics is fed, whether in apparatus adapted for the taking or projection of pictures, or in apparatus for the recordation or reproduction of sound, either alone or in conjunction with images of things, or in apparatus of other types.

Certain parts of the subject matter in this case, hereinafter clearly indicated, will be found in our co-pending application, Serial Number 345,716, filed March 9, 1929.

An object of the present invention is the provision of an improved mechanism for the bodily removal of a film from a feeding member, an improved mechanism for bodily positioning the film in operative relation to such feeding member, or to the gate of the film handling apparatus, or to both of the same.

Another object of the present invention is the provision of an improved and simplified means for the operation of such mechanisms, in which such operation is preferably directly controlled by or with the movement of one section of the gate. A further object of the invention is the provision of operating means for either or both of such mechanisms whereby operation thereof in the desired timed or sequential relation to the movement of a section of the gate or to each other is secured, with the interposition of the desired period of dwell.

A further and important object of the present invention is the construction and arrangement of the various parts so that, when the method of lateral threading is employed, first the film is bodily moved into the desired position within a gate which is maintained in completely open position while the teeth of the moving member are completely protected, and locked therein, second, such teeth are rendered accessible, by the film, and third the film is pressed into driven relation with such teeth and the gate completely closed, or, when the method of endwise threading is employed, first the side member of the gate is rotated into position while the presser member is maintained in distant relation to the fixed member and the teeth of the film completely protected, second, such teeth rendered accessible, and, third, the film placed in driven relation with such teeth and the gate completely closed. It will be noted that we provide a gate structure which can advantageously be employed with either method of threading.

In apparatus constructed according to the present invention, the film removing member is preferably so designed as to protect the film from the teeth of the film feeding member after it has been operated to remove the film from such feeding member, and also to guide it during the preliminary positioning thereof in the apparatus.

Other objects of our invention include the provision of simplified and inexpensive operating mechanism for the film removing guiding and protecting members and for the film positioning and locking members, and the provision of means whereby the operation of such members and of the movable section of the gate may be timed as desired, and the provision of means for positively locking all such members and the gate in the desired position.

Other objects, advantages and characteristics are apparent in the following description, the attached drawings and the subjoined claims. Although we are showing one preferred embodiment of our invention, it will be readily understood that we are not limited to any particular construction as changes can readily be made without departing from the spirit of our invention or the scope of our broader claims.

In the drawings:

Figure 4 is a right side elevation of the gate constructed in accordance with a preferred modification of our invention showing the film removing mechanism and the film positioning mechanism, the gate being open.

Figure 1:
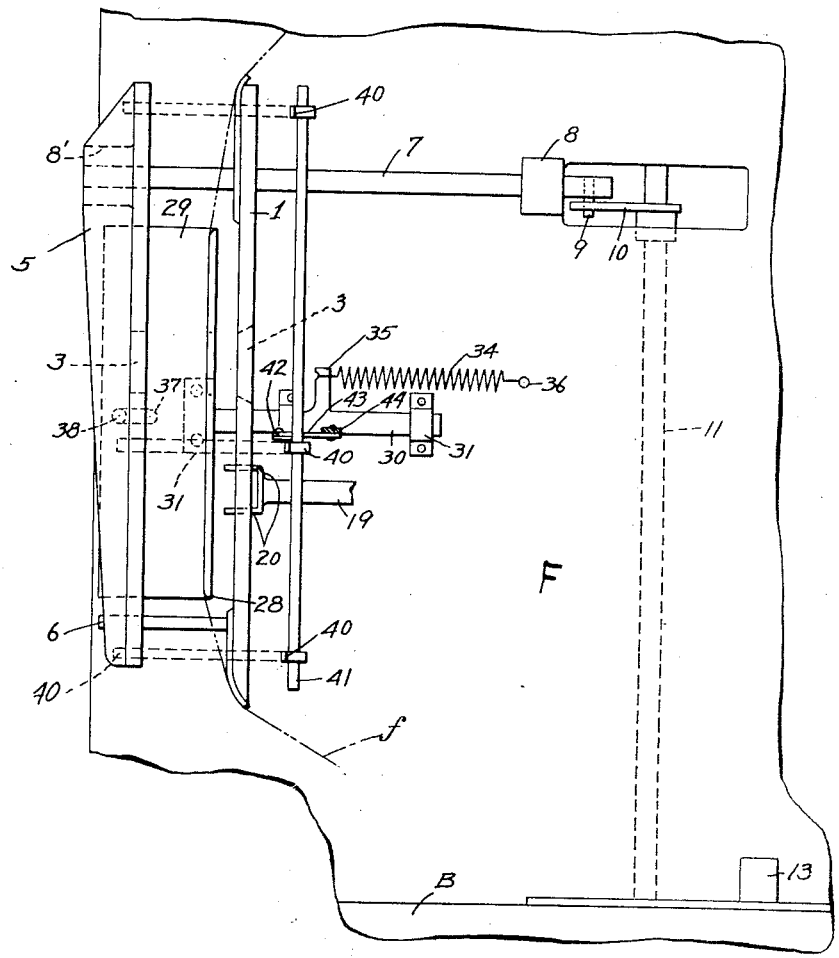
Figure 1 is a right side elevation of the gate, showing the film removing positioning and guiding mechanism, the gate being open.

Figure 5 is a top plan view of Figure 4, with parts 61, 63 and 69 omitted for clarity and part 28' shown extended in a formed guiding member 59.

Figure 6 is a sketch of the auxiliary guiding member disposed between the major guiding member and the fixed gate section, as for use as in an apparatus employing the method of so-called end-wise threading.

In carrying out our invention, there is preferably mounted on the front side of the frame F a fixed gate section 1 secured in any desired manner against movement relatively to the frame. This section is preferably formed with an aperture 3, through which light may be passed as is well understood in the art. Cooperating with the section 1 is a relatively movable section 5 preferably guided by a pin 6 projecting outwardly from the section 1, and, by means of the boss 8', secured to one end of a gate opening rod 7 slidable through a suitable opening in the gate section 1 and a suitable bearing 8 on the frame F. By reason of this construction, it will be apparent that when the rod 7 is moved to the right as viewed in Figure 1 or 4, it will be effective for moving the section 5 toward the section 1 and into cooperative relation therewith, while movement in the opposite direction will move the section 5 away from section 1 to permit the removal of a film and the insertion of another film.

Figure 2:
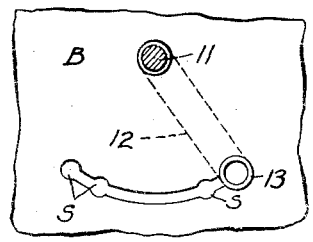
Figure 2 is a view of a portion of a control mechanism adapted to operate the gate.

In order to move such rod 7, a pin 9 may be affixed to the right hand end thereof, as viewed in Figure 1, and cooperate with an appropriate slot in the link 10 which is attached to the gate control shaft 11, which may be suitably mounted upon the rearward side of the frame F. As will be apparent by reference to Figures 2 and 3, such shaft may be rotated through the medium of the link 12 attached to the lower end thereof and the button 13 which may project above the base B of the apparatus. A plurality of operating stations, S (Figure 2) may be constructed by enlarging the arcuate slot through which the button 13 moves.

Figure 3:
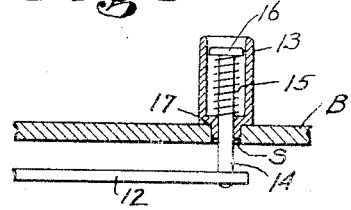
Figure 3 is a sectional view of a portion of the control mechanism and the member for locking it into a pre-determined position.

As will be evident by reference to Figure 3, the control button 13 includes a pin 14 connected to the lever 12, such pin being surrounded by the compression spring 15 which is confined between the head 16 of the pin 14 and the top of the collar 17 with which the button 13 downwardly terminates, such collar being adapted to cooperate with the enlargements S which form the operating stations in the arcuate slot. By reason of such construction, it will be clear that the button 13 may be moved upwardly upon the pin 14 at the will of the operator so that the control mechanism may be moved to any station, and that the button, when moved to any such station, will be held locked therein by the action of the spring 15 which holds the collar 17 in position at the station to which it has been moved.

It will be readily understood, however, that if desired the gate control rod 11, or other desired mechanism for operating the herein described members, may be controlled automatically in timed or sequential relation with the other operable elements of the apparatus, as, for example, by means of the apparatus described and claimed in our co-pending application, Serial Number 352,525, filed April 4, 1929, or in the other co-pending applications to which reference is made therein.

For effecting the desired intermittent feeding movement of a film through the gate, there may be provided a feeding member 19 having film engaging teeth 20 adapted to operate through suitable openings in the gate and to engage perforations in the film. Such member may be driven in any suitable manner.

A portion of the fixed gate section 1 may be suitably relieved to accommodate therein the right-angled extension 28 of the stripping guiding and shielding member 29 which is mounted upon the flat plate 30 which is guided as by the brackets 31 attached to the frame F and urged to the right as viewed in Figure 1 by the tension spring 34 one end of which is attached to a right-angled protuberance 35 of the plate 30 and the other end of which is attached to the pin 36 fixed in the plate F. In the slot 37 of the stripping and shielding member 29 there operates the pin 38 fixed upon the movable gate section 5.

By reason of this construction, it will be evident that as the movable gate section 5 is moved to the right, as shown in the drawings, by means of the rod 7, the spring 34 will be effective to move the stripping and shielding member 29 until the right-angled portion 28 thereof is seated within the recess provided therefor in the fixed gate section 1, such seating obviously being accomplished during the first portion of the movement of the movable gate section 5. Further movement of the gate section 5 will be without effect upon the shield 29 since the pin 38 will move in the slot 37. When the gate is completely closed, the member 29 will cooperate with the fixed gate section 1 to form a portion of the film track. Movement of the movable gate section 5 to the left as viewed in the drawings will be without effect upon the member 29 until the pin 38 has travelled the length of the slot 37, thereupon it will be effective for moving the member 29 into operative position thereby removing the film from the teeth 20 of the member 19 and completely protecting it therefrom. Suitable openings are provided in the extension 28 through which the teeth 20 operate. The usual spring pressed plate for holding the film flat at the aperture may be provided, and the film track suitably relieved. Such features, being entirely conventional and forming no part of the present invention, are not shown.

To operate the positioning fingers 40 attached to the shaft 41, the arm 42 and the links 43 and 44 are provided, the link 44 preferably being a right-angled extension of the plate 30. It will thus be evident that when the plate 30 is moved to the right as viewed in Figure 1 in the manner previously described, the rod 41 will be rotated and the fingers 40 moved from the position shown in full line in Figure 1 to that shown in dotted line.

According to the preferred modification of our invention shown in Figures 4, 5 and 6, the gate opening rod 7 is attached to the boss 8a by means of the pin 51 affixed to such rod 7 and freely movable within the slot 52 within the boss 8a. To assure a direct longitudinal movement of the movable gate section 5' in view of such construction, an additional supporting pin 56 is provided therefor. The movable gate section 5 is likewise provided with a guiding extension 55 to assist in the initial position of the film within the apparatus. Likewise the right angled portion 28' of the film guiding and protecting member 29' embodies a guiding extension 59 which is curved in the opposite direction from the extension 55, such curved guiding surfaces serving to cooperate in the initial positioning of the film in the apparatus if such positioning is accomplished by the movement of the film lateral to its direction of travel through the apparatus. To provide a similar construction for a film which is positioned within the gate by the method of so-called endwise threading the upper portion 28' of the guiding member 29' is provided with an extension 61 one end of which is loosely hinged to the fixed gate section 1' in any appropriate manner as by the pin and slot connection illustrated at 62 and the other end of which is hinged to the member 29' at 63 so that upon the movement of the member 29' into cooperative relation with the fixed section 1' such guiding extension or auxiliary gate section 61 will freely move forwardly and upwardly but be prevented from movement into the film channel. A convenient arrangement is shown in Figure 6. Similarly the lower end of the portion 28' may be formed with an extension 69 which prevents the film from entering the space between the member 29 and the fixed gate section 1'.

By reason of such construction it will be evident that when a film is propelled from above between the gate sections the end of the film will be prevented from entering the space between the member 29' and the fixed gate section 1' and will be guided through the gate through a smooth and protected channel.

If desired, instead of the separate fingers 40, a single light solid plate, such as is described and claimed in our copending application, Serial Number 352,525, filed April 4, 1929, may be employed.

For operating the positioning rod 41' to which the positioning and locking fingers 40 are attached, a pinion 81 is provided which meshes with the arcuate rack 82 cut in the forward end of the plate 83 which is pivoted upon the pin 84 and extended to the right as viewed in Figures 4 and 5 to include the operating slot 85 with which the pin 86, fixed to the gate opening rod 7 cooperates. As will be readily observed by reference to Figure 5, this slot is so shaped that the initial portion of the movement of the gate opening rod 7 to the right as viewed in Figures 4 and 5 will be effective quickly and immediately to rotate the positioning and locking fingers 40 into the closed position. During such movement, the gate section 5' may be prevented from moving rightwardly because of the action of the spring 34 by any suitable conventional restraining means which will permit leftward movement of the movable gate section by the rod 7, and the gate section 5' will be motionless relative to the moving rod 7 owing to the lost motion provided by the movement of the pin 51 within the slot 52. The succeeding portion of the movement of the rod 7 will merely hold the control member 83 and the fingers 40 in the position into which they have been moved since the pin 86 will merely slide within the slot 85. During the first portion of such succeeding movement the spring 34 will be effective to move the member 29' to cooperative relation with the fixed gate section 1'. During the final phase of such movement, the pin 38 will move freely within the slot 37 so that the gate will be completely closed without further movement of the member 29'. Upon the corresponding opening movement of the gate, the first rotation of the button 13 will be entirely without effect upon the positioning and locking fingers 40 and will move the pin 51 through the slot 52. The second phase of such movement will be effective for moving the gate section 5' away from the fixed section 1' while maintaining the protecting member 29' motionless and the fingers 40 still in locking position. The third phase of movement will operate the member 29 and complete the gate opening operation while maintaining the locking fingers in locking position and will retract the locking fingers. By reason of such construction it is evident that the film is completely safeguarded at all times. During the gate closing operation the film is first positioned safely within its proper channel within the gate and then locked against any possible accidental movement. During such positioning movement the film is completely protected from the teeth 20 of the film moving member 19. Thereupon, engagement is permitted between the teeth of the moving member and the film, and the film protecting member advanced to a position wherein it cooperates with the movable section of the gate to form the path through which the film is regularly projected. In this construction the movable gate section also acts as the shoe or presser member which is effective to hold the film in driven engagement with the film moving member. As previously pointed out, upon the opening of the gate the film is likewise locked therewithin until it is completely removed from the teeth of the moving member and protected therefrom and until the gate is completely opened, the sequential operation of the stripping, protecting and guiding member and of the movable section relative to each other having prevented the possibility of the occurrence of the difficulties to which reference has already been made.

It will be evident that our invention may be applied to any type of film handling apparatus, although in this specification it is described as applied to a projector or camera.

The above construction furnishes means whereby the positioning, guiding and shielding members may be actuated in a novel and useful timed relation to the movement of the gate and to each other.

Certain of the advantages of the present invention have been set forth in the preceding portion of this specification.

Other advantages include the provision of a simplified, efficient, and inexpensive film guiding removing and protecting member, positioning and locking member, and mechanism for operating the same. Other advantages include the provision of accelerated operation of such members relative to the closing of the gate and delayed operation relative to the opening of the gate.

Still other advantages include the provision of film guiding removing and protecting means which when the gate is closed, cooperate with the fixed and movable gate sections to form a portion of the channel through which the film may be operated, such means preferably being operated by the movement of the gate, and, when the gate is open, cooperate with the movable gate section to form a completely enclosed and unimpeded channel through which the free end of a film may be propelled or an auxiliary film path, of similar characteristics, into which the film may be mechanically inserted and locked.

We claim:

1. In a film handling apparatus, an openable gate, said gate including a fixed section and a section movable relatively thereto, a member for moving a film into a predetermined position between said sections, and operating mechanism therefor, said operating mechanism comprising an actuating member and operating connections between said actuating member and said movable gate section and said positioning member, the first portion of the movement of said actuating member being effective in cooperation with said connection for completing the operation of said positioning member while maintaining said movable section motionless and in completely opened relation to said fixed section and the succeeding portion of the movement of said actuating member being effective for moving said movable section into cooperative relation with said fixed section for the purpose of closing said gate.

2. In a film handling apparatus, an openable gate comprising a fixed section and a section movable into cooperative relation therewith for the purpose of defining a path along which a film may be fed, a toothed member for feeding a film along such path, means movable to a position between the teeth of said member and such path for the purpose of protecting the film from such teeth, means for moving the film into a predetermined position adjacent such path, and operating mechanism interlocking said movable section and both of said means, said mechanism first operating said moving means while said movable section is maintained fixed in open relation to said fixed section and said film protecting means is maintained in protective position between such teeth of said member and the film and thereafter said protecting means being moved by said mechanism from such protective position whereby such teeth are rendered accessible by the film and said movable section being moved into completely cooperative relation with said fixed section whereby such film path is defined.

3. In a film handling apparatus, an openable gate comprising a fixed section and a section movable relatively thereto, a toothed member for feeding a film between said sections, means for protecting the film from the teeth of said member, means for moving the film into a predetermined position between said sections, and operating mechanism interlocking and motivating said movable section and both of said means, said mechanism first operating said positioning means while maintaining said movable section and film removing means in fixed position and second releasing said film protecting means and rendering same inoperative and third moving said movable section into cooperative relation with said fixed section.

4. In a film handling apparatus, an openable gate, comprising a fixed section and a section movable relatively thereto, a toothed member for feeding a film between said sections, means for removing the film from the teeth of said member, means adapted to engage the edge of the film for maintaining it within said gate, and control mechanism interlocking and sequentially motivating all of said means, said control mechanism first moving said movable section a portion of the distance away from said fixed section, second operating said film removing means, and third moving said film locking means from operative position.

5. In a film handling apparatus, a toothed film feeding member, means for removing the film from the teeth thereof, means for locking the film against lateral movement relative thereto, and control mechanism interlocking both of said means and effective first to operate said film removing means while maintaining said locking means in locking position and second to remove said locking means from such position.

6. In a film handling apparatus, a toothed feeding member, means for protecting the film from the teeth of said member, said means forming an auxiliary film path, means for moving the film into a predetermined position opposite such feeding member, and control mechanism interlocking both of said means and effective for operating said positioning means while maintaining said protecting means locked motionless in protecting position and thereafter to remove said protecting means from such position to a position to form a portion of the auxiliary film path.

7. In a film handling apparatus, an openable gate, comprising a fixed section, a first section movable relatively thereto, a second section movable relatively to both of said other mentioned sections and disposed therebetween, means for moving said first movable section away from said fixed section, and means for operating said second movable section, said operating means comprising a spring tending to move said second movable section away from said first movable section and into cooperative relation with said fixed section and a connection between said first and second movable sections whereby the movement of said first movable section away from said fixed section overcomes the power of said spring and moves said second movable section away from said fixed section.

8. In a film handling apparatus, an openable gate, comprising a fixed section, a first section movable from a distant position to a cooperative position relatively thereto, a second section movable relatively to both of said other mentioned sections and disposed therebetween, means for moving said first movable section from such distant to such cooperative position, and means for operating said second movable section, said operating means including a spring tending to cause the movement of said second movable section away from said first movable section and into cooperative relation with said fixed section and a connection between said first and second movable sections, said connection limiting such movement of said second movable section by the position of said first movable section relative to said fixed section.

9. In a film handling apparatus, an openable gate, comprising a fixed section, a first section movable from a distant position to a cooperative position relatively thereto, a second section movable relatively to both of said other mentioned sections and disposed therebetween, means for moving said first movable section from such distant to such cooperative position, and means for operating said second movable section, said operating means comprising a spring tending to cause the movement of said second movable section away from said first movable section and into cooperative relation with said fixed section and a connection between said first and second movable sections embodying a lost motion device whereby while said first movable section is maintained in such distant position said second movable section is maintained in a predetermined position between said first movable section and said fixed section, and during the initial portion of the movement of said first movable section from such distant position toward said fixed section said spring is effective for moving said second movable section toward said fixed section and into cooperative relation therewith, and that during the final portion of such movement of said first movable section toward said fixed section said first movable section is without effect upon said second movable section.

10. In a film handling apparatus, an openable gate comprising a fixed section and a section movable to a cooperative and parallel position relative thereto for the purpose of providing a path through which a film may be fed and to a distant position relative thereto for the purpose of expediting the initial positioning of the film in said apparatus, an intermediate member movable between said sections and parallel thereto for the purpose of cooperating with said movable section and creating an auxiliary film path for the initial positioning of the film in said apparatus distant from such above mentioned feeding path, and a guide member for bridging the gap between said intermediate member and said fixed section whereby the propelled end of a film is guided into said auxiliary path.

11. In a film handling apparatus, an openable gate comprising a fixed section and a section movable to a cooperative and parallel position relative thereto for the purpose of providing a path through which a film may be fed and to a distant position relative thereto for the purpose of expediting the initial positioning of the film in said apparatus, an intermediate member movable to a position between said sections when separated and parallel thereto and cooperating with said movable section and creating an auxiliary film path for the initial positioning of the film in said apparatus distant from such above mentioned feeding path, a guiding member connecting one extremity of said intermediate member with said fixed member, said guiding member intersecting said feeding path for bridging the gap between said intermediate member and said fixed section when said intermediate member is positioned between said sections whereby the propelled end of a film is guided into said auxiliary path and means for moving said movable section into such distant position and said intermediate member into such position between said movable and said fixed sections.

12. In a film handling apparatus, an openable gate defining a path through which a film may be fed, and a toothed member for feeding a film through such path, said gate including a section movable to a first position wherein said toothed member projects therethrough and into such path in a direction substantially at right angles to such path and across such path and to a second position wherein said section is disposed beyond such path and the teeth of said member and a guiding member in engagement with one extremity of said section, when said section is disposed in such second position, said guiding member intersecting such feeding path for guiding the propelled end of a film out of such path and along the surface of said section.

13. In a film handling apparatus, a gate and a support therefor, said gate including a section movable relatively to said support to one position for the initial positioning of a film in said gate or to another position for defining a portion of the path for the film therethrough, an auxiliary guiding member movable relatively to said section and to said support, and an operating connection between said section and said member, said connection, said section, and said member cooperating with each other in providing a substantially continuous guiding surface for a film when said section is disposed in either of said positions.

14. In a film handling apparatus, a fixed support and a gate, said gate including a first section movable relatively to said fixed support, a second section movable to or from cooperative relation with said first section, and a third section connected to both said first section and said support and so disposed as to guide a film into position between said first and second sections, and means for moving said sections.

15. In a film handling apparatus, a sectional gate adapted for arrangement in a first position wherein a path is defined through which a film may be fed and a second position wherein the film may be initially positioned within said gate, said gate including three sections, a first and second of said sections being movable relatively to each other and to the third thereof, means for mounting said sections, and operating mechanism interlocking said movable sections, said mounting means and said operating mechanism cooperating to dispose said gate sections in said first position, wherein said first and second sections are disposed in cooperative and parallel relation to each other so that said first section defines one side of said path and said second section defines the other side of said path, and alternatively in said second position, wherein said first and second gate sections are disposed in distant relation to each other and said third section is disposed in contiguous relation to said first section whereby the film may be guided into the space between said first and second sections for the purpose of initially positioning it within said gate.

16. In a film handling apparatus, a gate, said gate comprising a plurality of sections, an actuating member effective for arranging said sections in one position wherein they define a path through which the film may be fed or in another position wherein they produce a space therebetween into which the film may be initially introduced, an operable guiding member in engagement with one of said sections, and an operating mechanism connecting said guiding member and said gate, for disposing said sections in one of such positions and said member in parallel relation to one side of such path and for disposing said sections into such other mentioned position and said member in angular relation to such path.

17. In a film handling apparatus, an openable sectional gate, a member for moving a film into the space which intervenes between said sections when said gate is open, and operating mechanism for said member, said mechanism comprising a rotatable mounting for said member, an actuating member, and means for operatively connecting said actuating member and said mounting, said actuating member rotating said mounting during one portion of the movement of said actuating member and during another portion of such movement holds said mounting fixed against movement, said connecting means including a pin movable in an irregularly shaped slot.

WARREN DUNHAM FOSTER.
FREDERICK DAVENPORT SWEET.